United States Patent

[11] 3,607,015

[72] Inventors George M. Low
Deputy Administrator of the National Aeronautics and Space Administration in respect to an invention of;
Jerry R. Lundquist, Richland, Wash.;
Robert B. King, Westlake, Ohio
[21] Appl. No. 33,535
[22] Filed Apr. 30, 1970
[45] Patented Sept. 21, 1971

[54] PREPARATION OF HIGH PURITY COPPER FLUORIDE
9 Claims, No Drawings

[52] U.S. Cl. ............................................. 23/88, 23/55, 23/97
[51] Int. Cl. ............................................. C01g 3/04

[50] Field of Search............................................. 23/88, 97, 55

[56] References Cited
OTHER REFERENCES

AEC- tr- 3927 (Pt. 2) " The Chemistry of Fluorine and its Inorganic Compounds" by I.G. Ryss, pages 640- 642. U.S. Atomic Energy Commission. Copy received in U.S. Pat. Office Scientific Library August 26, 1960.

*Primary Examiner*—Edward Stern
*Attorneys*—N. T. Musial, G. E. Shook and J. R. Manning ABSTRACT: Copper hydroxyfluoride (CuOHF) powder is heated in a chamber and subjected while hot to flowing fluorine ($F_2$) gas to produce high purity copper fluoride ($CuF_2$).

PREPARATION OF HIGH PURITY COPPER FLUORIDE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435, 42 U.S.C. 2457).

BACKGROUND OF THE INVENTION

The invention is directed to a method of producing copper fluoride and more particularly to a method of producing high purity copper fluoride from CuOHF.

At the present time, a great deal of effort in the battery industry is directed to producing a high-energy density battery suitable for use in space vehicles. Batteries utilizing copper fluoride as a cathode material have been found to require copper fluoride of extremely high purity in order to yield satisfactory results.

In the past, copper fluoride has been produced by such methods as fluorinating copper metal or fluorinating some copper compound such as copper sulfide. Attempts have also been made to produce high-purity copper fluoride by decomposing copper ammonium fluoride in the presence of fluorine. However, none of the aforementioned methods has yielded copper fluoride of the required purity, that is, the presence of no more than 50 p.p.m. by weight of any contaminating element.

OBJECTS AND SUMMARY OF THE INVENTION

It is an object of the invention to provide a new and novel method of producing copper fluoride.

It is another object of the invention to provide a method of producing copper fluoride of high purity.

Another object of the invention is to provide a method of producing copper fluoride powder which is substantially free of clinkers.

Yet another object of the invention is to provide a method of producing copper fluoride by utilizing a copper compound which is not significantly passivated as the reaction proceeds to completion.

DESCRIPTION OF A PREFERRED EMBODIMENT

In accordance with the invention, the highest purity powdered CuOHF commercially available is placed in a container such as a copper boat or shelf. The partical size of the CuOHF powder is preferably less than 100 mesh and may be obtained by screening the powder through a 100 mesh screen.

The container is placed in a reaction vessel or chamber fabricated from some material which is resistant to the corrosiveness of fluorine gas, such as, for example, nickel or Monel. The CuOHF powder in the container is leveled to a uniform depth of from about one-hundredth to about one-fourth inch. The preferred depth is about one-eighth inch. If the CuOHF contains an excess of water, it should be dried before proceeding. The drying may be accomplished by flowing nitrogen gas through the reaction vessel which may be heated. The reaction vessel should then be passivated. This is done by flowing fluorine and nitrogen gas through the reaction vessel until all interior surfaces are adequately passivated. Fluorine gas is then admitted to the reaction vessel which is then heated to a temperature in the range of from about 475° C. to about 525° C. with the preferred temperature being about 500° C. Fluorine gas is flowed over the powder for a period of from about 20 minutes to about 40 minutes, the preferred time period being 30 minutes when the depth of CuOHF is about one-hundredth of an inch.

The first reaction which takes place in the reaction vessel is that the copper hydroxyfluoride powder yields copper oxide powder and hydrogen fluoride gas. The gas exits from the reaction vessel with the fluorine gas through an exhaust outlet. Advantageously, the liberation of the hydrogen fluoride gas inhibits the formation of clinkers. The copper oxide then reacts with the fluorine gas to yield copper fluoride and oxygen. The liberated oxygen is exhausted from the reaction vessel with the hydrogen fluoride gas and the fluorine gas leaving high-purity copper fluoride in the reaction vessel.

An example of producing high-purity $CuF_2$ by the method of the invention will now be given. The reaction vessel is a nickel pipe about 13¼ inches long and having an inside diameter of about 4½ inches. A copper liner is provided for the nickel reactor vessel.

One hundred and forty grams of CuOHF smaller than 100 mesh is spread to a uniform depth of about one-eighth inch in a copper boat which is placed in the reaction vessel. The CuOHF is dried by flowing nitrogen gas at a rate of 60 to 100 cm.$^3$/min. for 16 hours through the reaction vessel which has been heated to a temperature of about 170° C.

The reaction vessel is then passivated by flowing therethrough 75 to 125 cm.$^3$/min. of fluorine and 75 to 125 cm.$^3$/min. of nitrogen for 8 to 12 minutes at 170° 'C. The fluorine flow is then increased to about 200 cm.$^3$/min. and the nitrogen flow is decreased to about 30 cm.$^3$/min. this rate being maintained from 8 to 12 minutes.

If additional drying is needed, it may be carried out by flowing 200 cm.$^3$/min. of $F_2$ and 80 cm.$^3$/min. of nitrogen through the reaction vessel for about 1 hour at about 350° C.

After the reaction vessel is passivated, its temperature is raised to about 480° C. for about 5 to 7 hours. During this time the fluorine flow rate is maintained at about 200 cm.$^3$/min. and the nitrogen flow is about 80 cm.$^3$/min.

The reaction vessel is then cooled, purged with nitrogen gas and placed in a dry box. The $CuF_2$ product which is a powder of less than 100 mesh is removed to an inert atmosphere such as argon, helium or nitrogen where it may be pulverized to the desired particle size, such as 200 mesh, by means of a copper mortar and pestle. The $CuF_2$ is then analyzed to determine if it meets the required purity of less than 50 p.p.m. of any contaminating element. If it does not, it is returned to the reaction vessel and the process is repeated.

The powdered $CuF_2$ may be stored in an inert atmosphere in a container such as a sealable quartz bottle from which all moisture has been removed.

Table I below indicates the impurities present in a typical CuOHF batch placed in the reaction vessel while table II shows the impurities in $CuF_2$ produced from this CuOHF batch by the inventive method. These tables were prepared from spark source mass spectrometer analysis figures.

Table I

CuOHF Impurities

| Element | p.p.m. by weight |
| --- | --- |
| Fe | 4 |
| Ti | 4 |
| Ca | 2 |
| K | 20 |
| Si | <40 |
| Al | <2 |
| Mg | 50 |
| Na | 10 |
| C | 1,200 |
| Cl | 100 |

Table II $CuF_2$ Impurities

| Element | p.p.m. by weight |
| --- | --- |
| Co | 2 |
| Ni | 2 |

Table II – Continued

| | |
|---|---|
| Fe | 6 |
| Cr | 0.5 |
| Ca | 4 |
| K | 10 |
| Na | 20 |
| N | 1 |
| C | 20 |
| O | 40 |
| H | 4 |

It will be understood that changes and modifications may be made to the above-described method by those skilled in the art without departing from the spirit and scope of the invention as set forth in the claims appended hereto.

What I claim is:

1. A method of making high-purity copper fluoride comprising the steps of:
    placing powdered CuOHF in a copper-lined reaction vessel;
    passing $F_2$ gas through said vessel;
    heating said vessel and said CuOHF to a temperature in the range of from about 475° to about 525° C.; and
    maintaining the passage of said $F_2$ gas and the temperature until the reaction goes to completion.
2. The method of claim 1 wherein said CuOHF is heated to a temperature of about 525° C.
3. The method of claim 1 wherein said CuOHF is disposed in a copper boat.
4. The method of claim 1 wherein CuOHF powder has a particle size smaller than about 100 mesh.
5. The method of claim 1 wherein said $F_2$ gas flow and said heating temperature are maintained for about 20 to 40 minutes when the depth of said CuOHF is about one-hundredth of an inch thick.
6. The method of claim 1 wherein said powdered CuOHF is distributed in a layer of from about one-hundredth to one-fourth inch thick.
7. The method of claim 1 wherein nitrogen gas is passed through said reaction vessel containing said CuOHF simultaneously with said $F_2$ gas while said vessel temperature is in said 475° to 525° C. temperature range.
8. The method of claim 1 wherein said CuOHF is dried by passing nitrogen gas through said reaction vessel at 170° C. before $F_2$ gas is admitted to said vessel.
9. The method of claim 1 including the additional steps of:
    cooling said reaction vessel;
    purging said reaction vessel with nitrogen; and
    placing said reaction vessel in a dry box prior to removing the $CuF_2$ product.